3,048,621
PRODUCTION OF ACRYLIC ACID ESTERS
Robert Stadler and Friedrich Becke, Heidelberg, Germany, assignors to Badische Anilin- & Soda-Fabrik Aktiengesellschaft, Ludwigshafen (Rhine), Germany
No Drawing. Filed Dec. 18, 1957, Ser. No. 703,506
Claims priority, application Germany Dec. 18, 1956
8 Claims. (Cl. 260—479)

The object of this invention is a process for the production of acrylic acid esters from acetylene, carbon monoxide and alcohols or phenols in the presence of suitable catalysts. The invention has as its special object to provide a further improvement in the acrylic acid esters synthesis according to W. Reppe in which acetylene, carbon monoxide and alcohols or phenols are reacted in the presence of carbonyl-forming metals or their compounds at elevated temperatures and increased pressure.

The halides of carbonyl-forming metals, especially nickel halides, in combination with a copper halide as activator, have proved to be especially suitable catalysts in the production of acrylic acid esters according to Reppe. The catalyst is dissolved or suspended in an inert oxygen-containing organic solvent which is used in excess.

We have now found that the amount of catalyst can be reduced and at the same time the throughput can be considerably increased by carrying out the production of acrylic acid esters by catalytic reaction of acetylene and carbon monoxide with alcohols or phenols at elevated temperature and under increased pressure in the presence of catalytic amounts of a catalyst containing a carbonyl-forming metal and halogen and of small amounts of a heavy metal or a compound of the same, especially a heavy metal halide, as activator in the absence of an organic solvent but in the presence of a compound which contains the grouping

As catalysts there are especially suitable the halides of carbonyl-forming metals, especially nickel halides, for example nickel-(2)-chloride, bromide and iodide, and complex compounds of nickel, as for example nickel acetonyl acetonate, the nickel bromide-triphenyl phosphine-alkyl bromide complex, and the like, and when using nickel acetonyl acetonate as heavy metal compound it is preferable to add a halide of the heavy metal. There may be used however carbonyl-forming metals themselves or their halogen-free compounds in admixture with halogen or halogen compounds. These compounds can be dissolved in small amounts of water before their addition to the alcohol or phenol. Depending on the nature and amount of the activator added, the amount of catalyst should preferably amount to 0.01 to 1 percent with reference to the amount of alcohol or phenol introduced; as a rule it lies between 0.05 and 0.1 percent.

For the activation of the catalyst, only very small amounts of a heavy metal or a heavy metal compound, are necessary, for example 3 to 20 percent of the amount of catalyst. Copper and mercury halides have proved especially effective. A very active catalyst is for example nickel bromide and cuprous iodide.

It is often advantageous to add hydrogen halide, for example HCl or HBr, to the reaction mixture. The amount of hydrogen halide added may amount to about 0.01 to 1 percent, with reference to the weight of the alcohol or phenol introduced, and therefore corresponds to the amount of catalyst used. The throughput is further increased by the addition of hydrogen halide, and moreover paler reaction liquids are obtained.

The activating action of copper is so great that extremely small amounts of copper cause considerable action in the presence of compounds which contain the grouping

A smaller activation of the catalyst is obtained by the addition of compounds of other heavy metals, especially their halogen compounds. As such there may be used zinc iodide, cadmium iodide, lead iodide and chromium chloride. The simultaneous use for example of cadmium iodide and zinc iodide gives a better action than the addition of the said compounds by themselves. Accordingly the copper compound used for activation of the catalyst can also be partly replaced by one or more of the other heavy metal compounds mentioned above.

Suitable initial materials for the process according to this invention are monohydric or polyhydric aliphatic alcohols, for example aliphatic alcohols containing 1 to 4 carbon atoms, such as methanol, ethanol, propanol, normal-butanol, isobutanol or ethylene glycol, glycerine and the like. Aromatic alcohols and also phenols may also be used. When two different alcohols are present at the same time, the corresponding acrylic acid esters are formed side by side. The higher alcohol is thereby preferentially converted into the corresponding acrylic acid ester. Thus for example a mixture of ethyl acrylate and normal-butyl acrylate is obtained from a mixture of ethyl alcohol and normal-butanol.

As compounds which contain the grouping

all compounds containing carboxyl groups are suitable, for example monobasic or polybasic aliphatic or aromatic saturated or unsaturated carboxylic acids, for example formic acid, acetic acid, phthalic acid, terephthalic acid, acrylic acid, salicylic acid and the like. The substances containing carboxylic groups can be present in solid or liquid form. They are preferably added in amounts of about 1 to 5 percent with reference to the amount of alcohol or phenol introduced.

Ion exchange resins which contain free carboxyl groups are also effective.

Carbon dioxide, the partial pressure of which should amount to 2 to 4 percent of the autoclave pressure, also effects a good ester formation in the presence of a small amount of water, especially when mercury iodide is used at the same time.

Acrylic acid is especially effective. This, especially when preparing the methyl ester in the presence of mercury iodide or also of zinc cadmium iodide, forms with the alcohol the ester and is thereby substantially used up.

The reaction conditions correspond to those which are usual in the synthesis of acrylic acid esters according to Reppe. The working temperature amounts to about 100° to 250° C. and the partial pressure of the acetylene is suitably more than 5 atmospheres, preferably between 10 and 80 atmospheres. The process can be carried out discontinuously or continuously.

The parts specified in the following examples, which are merely illustrative and not limitative, are parts by weight and the percentages specified are percentages by weight, in so far as nothing is stated to the contrary. Parts by volume are in the same ratio to parts by weight as the litre is to the kilogram.

The term "mixed gas" used in the examples means a gas mixture consisting of equal parts by volume of carbon monoxide and acetylene.

*Example 1*

1,720 parts of pure normal-butanol, 5 parts of nickel(2)bromide dissolved in 42 parts of water, 0.5 part of copper iodide, 160 parts of acrylic acid and 0.1 part of hydroquinone as stabilizer are charged into a stirring autoclave of alloy steel. After rinsing with nitrogen, mixed gas is forced in until the pressure is 24 excess atmospheres and the whole heated during the course of 40 minutes to 177° C. while stirring. The pressure thereby rises to 43 excess atmospheres. The autoclave is then cooled by blowing in with compressed air and stirred for about 60 minutes at a temperature of 187° to 197° C. and at a pressure which is kept between 35 and 58 excess atmospheres by the subsequent forcing in of mixed gas.

A dark yellow clear reaction liquid is found in the autoclave. It contains 50 grams of acid calculated as acrylic acid and 716 grams of butyl acrylate per litre. By distillation, 10 percent, with reference to the amount of ester, remain in the residue.

If the same experiment is carried out without the addition of acrylic acid, the autoclave, even at temperatures between 209° and 219° C. and at a constant pressure of mixed gas of 58 excess atmospheres, will only absorb in two hours far less than half the mixed gas. 448 parts of ester and 10.8 parts of acid calculated as acrylic acid are then obtained. 70 percent with reference to the amount of ester, remain in the residue.

Example 2

1,720 parts of pure isobutanol, 5 parts of nickel(2)bromide in 42 parts of water, 0.5 part of copper(2)bromide, 150 parts of acrylic acid and 0.1 part of hydroquinone as stabilizer are charged into a stirring autoclave of alloy steel and heated with mixed gas as in Example 1. When the reaction has set in at 175° C., the temperature is kept for an hour between 175° and 187° C. The pressure in the autoclave is kept between 40 and 58 atmospheres by forcing in mixed gas continuously. 3,190 parts by volume of reaction liquid are obtained. It contains 710 grams of isobutyl acrylate and 50.5 grams of acrylic acid per litre. 8 percent with reference to the amount of ester formed remain in the residue.

Example 3

1,720 parts of pure isobutanol, 5 parts of nickel(2)bromide dissolved in 40 parts of water, 1 part of mercury(2)iodide dissolved in alcohol, 45 parts of acetic acid and 0.1 part of hydroquinone are charged into a stirring autoclave of alloy steel. It is then rinsed with nitrogen. Mixed gas is forced in up to a pressure of 24 excess atmospheres and the autoclave heated. The reaction sets in at about 195° C. The temperature in the autoclave is kept for two hours at 197° to 209° C. and the pressure at 50 to 58 excess atmospheres by forcing in mixed gas. The experiment is then discontinued. A pale yellow reaction liquid is obtained which contains per litre 36 grams of acid calculated as acrylic acid and 840 grams of acrylic acid isobutyl ester. By distillation, 11 percent with reference to the amount of ester formed remain in the residue.

Example 4

2,000 parts of pure ethanol, 5 parts of nickel(2)bromide dissolved in 50 parts of water, 1.7 parts of mercury(2)iodide dissolved in ethanol, 60 parts of phthalic acid and 0.1 part of hydroquinone are charged into a stirring autoclave. After the autoclave has been rinsed out with nitrogen, mixed gas is forced in to an excess pressure of 24 atmospheres and the autoclave heated up. Strong gas absorption in the autoclave commences at 190° C. The autoclave pressure is kept for two hours at 40 to 58 excess atmospheres by forcing in mixed gas, the temperature amounting to 197° to 204° C. 3,130 parts by volume of reaction liquid are obtained which contains 28.8 grams of acid calculated as acrylic acid and 726 grams of ethyl acrylate per litre. 9 percent with reference to the amount of ester formed remain in the residue upon distillation.

Example 5

1,435 parts of pure methanol, 4 parts of nickel(2)bromide dissolved in 40 parts of water, 1 part of copper iodide and 212 parts of acrylic acid are charged into a stirring autoclave. Into the autoclave which has been rinsed with nitrogen, mixed gas is forced in until the pressure is 24 excess atmospheres and then heated. The reaction sets in at 186° C. and 44 excess atmospheres. The temperature of the autoclave is kept at 190° C. for 2½ hours and the gas pressure in the autoclave kept at between 50 and 58 excess atmospheres. In the cooled autoclave there are 2,980 parts by volume of reaction liquid. It contains 21.6 grams of acid calculated as acrylic acid and 672 parts of methyl acrylate per litre. The distillation residue amounts to 8 percent with reference to the amount of ester formed.

Example 6

95.5 parts of pure normal-butanol, 0.4 part of nickel(2)bromide dissolved in 3 parts of water, 0.04 part of copper iodide and 1 part of benzoic acid are charged into a shaking autoclave. The autoclave is rinsed with nitrogen. Then mixed gas is forced in until the pressure is 26 atmospheres. After a heating-up period of half an hour, the reaction sets in at 180° C. and 28 excess atmospheres. The temperature of the autoclave is kept at about 200° C. and the pressure, after being brought to 56 excess atmospheres by forcing in mixed gas, falls to 30 excess atmospheres. After the experiment has lasted 3 hours and there has been a total fall in pressure of 345 atmospheres, the experiment is discontinued. There are 168 parts by volume of reaction liquid in the autoclave, and they contain 18 grams of acid calculated as acrylic acid and 713 grams of normal-butyl acrylate per litre. The distillation residue amounts to 8 percent with reference to the amount of ester formed.

Example 7

71 parts of pure normal-butanol, 0.3 part of nickel(2)bromide dissolved in 2.5 parts of water, 0.13 part of copper bronze and 4.5 parts of phthalic acid are charged into a shaking autoclave. It is then rinsed with nitrogen and mixed gas is forced into the autoclave until the pressure is 24 excess atmospheres. After heating up the autoclave, the reaction sets in at 185° C. The autoclave temperature is kept for an hour and forty minutes between 194° and 198° C. and the gas pressure kept between 35 and 60 atmospheres by intermittently forcing in mixed gas. 125 parts by volume of reaction liquid are obtained which contain 557 grams of normal-butyl acrylate and 46.8 grams of acid calculated as acrylic acid per litre. The distillation residue amounts to 12 percent with reference to the amount of ester formed.

Example 8

71 parts of normal-butanol, 0.3 part of nickel(2)bromide dissolved in 1.7 parts of water, 0.3 part of lead(2)iodide and 4.5 parts of phthalic acid are charged into a shaking autoclave. The autoclave is rinsed with nitrogen and mixed gas forced in until the pressure is 24 excess atmospheres. It is then heated. The formation of ester sets in at 185° C. The temperature of the autoclave is kept at 200° C. for 2 hours and the pressure, whenever it falls below 32 excess atmospheres, is made up to 60 excess atmospheres by forcing in mixed gas. When the total fall in pressure amounts to 269 atmospheres, the experiment is discontinued. 118 parts by volume of the reaction liquid contain 576 grams of normal-butyl acrylate and 43.2 grams of acid calculated as acrylic acid per litre. The residue remaining after distillation amounts to 10.8 percent with reference to the amount of ester formed.

Example 9

30 litres of isobutanol containing 4 to 5 percent of acrylic acid, 0.05 percent of nickel bromide dissolved in 75 ccs. of water, 0.005 percent of copper bromide and 0.01 percent of hydroquinone as a stabilizer are pumped per hour into the bottom of a reaction chamber, capable of being heated externally, about 7 metres long and 100 millimetres in diameter having therein a concentrically arranged inner liquid circulation pipe of 50 millimetres internal width and 4.5 metres length. The temperature of the chamber is kept at 210° to 215° C. 11 normal cubic metres of mixed gas are led per hour at 50 to 60 excess atmospheres through a gas inlet pipe projecting into the inner circulation pipe. The gas leaving the chamber through a cooler contains 24 percent of acetylene. The reaction liquid is continuously withdrawn at the upper end of the chamber while maintaining a constant level of liquid. It is pale yellow in color, completely clear and contains 39.6 grams of acid calculated as acrylic acid and 625 grams of isobutyl acrylate per litre, i.e. almost 70 percent. The amount of distillation residue from the reaction liquid is 6.45 percent of the ester contained therein. 24 to 25 kilograms of ester are prepared thus per hour.

Example 10

The same reaction chamber as in Example 9 is used to prepare an acrylic acid ester from normal-butanol under the same conditions. The butanol supplied contains 4 percent of water, 0.05 percent of nickel bromide, 0.002 percent of copper bromide, 0.002 percent of chromium(3)chloride and 4 percent of acrylic acid. The reaction liquid contains 4.6 percent of acrylic acid and 67 percent of butyl acrylate. The distillation residue of the reaction liquid amounts to 7 to 10 percent with reference to the amount of ester contained therein. If the addition of acrylic acid to the butanol supplied is discontinued, the ester content of the reaction liquid remains practically the same, but the acrylic acid concentration amounts to 3.2 percent and the distillation residue of the reaction liquid amounts to 12 to 13 percent with reference to the amount of ester formed.

Example 11

750 parts of pure normal-butanol, 4 parts of nickel bromide dissolved in 20 parts of water, 1 part of cuprous cyanide and 51 parts of acrylic acid are charged into a shaking autoclave. It is rinsed with nitrogen and mixed gas is forced into the autoclave until the pressure is 24 excess atmospheres. After heating up the autoclave, the reaction commences at 183° C., and the temperature rises to 200° C. At this temperature the pressure is kept between 32 and 63 excess atmospheres by continuously forcing in mixed gas. After 2 hours there are obtained 1,330 parts of a reaction liquid which contain 1,000 parts of normal-butyl acrylate and 67 parts of acrylic acid. The distillation residue amounts to 11 percent with reference to the amount of ester formed.

Example 12

680 parts of normal-butanol, 2.6 parts of nickel propionate dissolved in 26 parts of water, 0.9 part of copper acetonyl acetonate, 44 parts of acrylic acid and 2.5 parts of zinc bromide are charged into a shaking autoclave. It is then rinsed with nitrogen, the autoclave heated and mixed gas forced in until the pressure is 24 excess atmospheres. The reaction commences at 180° C. and 27 excess atmospheres. The temperature in the autoclave is then kept between 188° and 200° C. for 90 minutes and the pressure kept between 32 and 63 excess atmospheres by forcing in mixed gas. There are thus obtained 1,050 parts of a reaction liquid with 670 parts of normal-butyl acrylate and 68 parts of acrylic acid. The distillation residue amounts to 8 percent with reference to the amount of ester obtained.

Example 13

90 parts of pure phenol, 0.6 part of nickel bromide, 0.2 part of copper bromide dissolved in 1 part of water and 5.5 parts of acrylic acid are charged into a shaking autoclave. It is then rinsed with nitrogen, mixed gas is forced in until the pressure is 24 excess atmospheres and the autoclave is heated. The reaction commences at 205° C. The temperature is kept for 4 hours at 220° to 225° C. and the pressure in the autoclave at 50 to 63 excess atmospheres by forcing in mixed gas. 117 parts of reaction liquid are obtained containing 46 parts of phenyl acrylate, 48.5 parts of phenol, 10 parts of acrylic acid, 0.47 part of water and 11 parts of residue.

Example 14

1,300 parts of 96 percent ethyl alcohol, 405 parts of normal-butanol, 5 parts of nickel bromide dissolved in 22 parts of water, 0.5 part of cuprous iodide, 1 part of hydrogen bromide and 84 parts of acrylic acid are charged into a shaking autoclave. Then it is rinsed with nitrogen, mixed gas forced in until the pressure is 25 excess atmospheres and the autoclave heated. The reaction sets in at 187° C. The temperature of the autoclave is kept at 194° to 199° C. for 1 hour and 20 minutes and the pressure kept at 58 to 63 excess atmospheres by forcing in mixed gas. The amount of reaction liquid is then 3,000 parts. It contains 1,800 parts of ethyl acrylate, 600 parts of butyl acrylate, 380 parts of ethyl alcohol, about 60 parts of normal-butanol, 180 parts of acrylic acid, 54 parts of water. The remainder is a non-distillable residue.

What we claim is:

1. In a process for the production of acrylic acid esters by the interaction of acetylene, carbon monoxide and an alcohol selected from the group consisting of a lower alkanol and phenol at a temperature of between about 100° C. to 250° C. and a pressure of more than 5 atmospheres and in the presence of minor amounts of nickel and an halogen ion selected from the group consisting of chlorine, bromine and iodine ions as catalysts and in the presence of a heavy metal selected from the group consisting of copper and mercury as activator, the improvement which comprises carrying out the reaction substantially in the absence of an inert organic solvent but in the presence of from about 1% to about 14.5% by weight with reference to the amount of said alcohol of a compound selected from the group consisting of a lower hydrocarbyl carboxylic acid and a lower hydrocarbyl dicarboxylic acid.

2. In a process for the production of acrylic acid esters by the interaction of acetylene, carbon monoxide and an alcohol selected from the group consisting of a lower alkanol and phenol at a temperature of between about 100° C. and 250° C. and a pressure of more than 5 atmospheres and in the presence of minor amounts of nickel and an halogen ion selected from the group consisting of chlorine, bromine and iodine ions as catalysts and in the presence of a heavy metal activator selected from the group consisting of copper and mercury, the improvement which comprises carrying out the reaction substantially in the absence of an inert organic solvent but in the presence of from about 1% to about 14.5% by weight of acrylic acid based on the weight of said alcohol.

3. A process as claimed in claim 2 wherein the catalyst is nickel bromide, the activator is copper iodine, and the alcohol is normal-butanol.

4. A process as claimed in claim 2 wherein nickel bromide is used as catalyst, copper bromide is used as activator, and isobutanol is used as alcohol.

5. A process as claimed in claim 2 wherein the catalyst is nickel bromide, the activator is copper iodide, and the alcohol is methanol.

6. In a process for the production of acrylic acid esters by the interaction of acetylene, carbon monoxide and an alcohol selected from the group consisting of a lower alkanol and phenol at a temperature of between about 100° C. and 250° C. and a pressure of more than 5 atmospheres in the presence of minor amounts of nickel and an halogen ion selected from the group consisting of chlorine, bromine and iodine ions as catalysts and in the presence of a heavy metal activator selected from the group consisting of copper and mercury, the improvement which comprises carrying out said reaction substantially in the absence of an inert organic solvent but in the presence of 1% to 5% by weight of a lower hydrocarbyl carboxylic acid based on the weight of said alcohol.

7. A process as claimed in claim 6 wherein the lower hydrocarbyl carboxylic acid is acrylic acid.

8. In the process of the production of acrylic acid esters by the interaction of acetylene, carbon monoxide and an alcohol selected from the group consisting of a lower alkanol and phenol at a temperature of between 100° C. and 250° C. and at a pressure of more than 5 atmospheres in the presence of minor amounts of nickel and an halogen ion selected from the group consisting of chloride, bromide and iodine ions as catalysts and in the presence of a heavy metal activator selected from the group consisting of copper and mercury, the improvement which comprises carrying out the reaction substantially in the absence of an inert organic solvent but in the presence of about 1% to 5% of lower hydrocarbyl carboxylic acid and wherein the amount of the catalyst is 0.01% to 1% by weight based on the weight of said alcohol.

References Cited in the file of this patent

UNITED STATES PATENTS

| | | |
|---|---|---|
| 2,582,911 | Neher et al. | Jan. 15, 1952 |
| 2,653,969 | Albrecht et al. | Sept. 29, 1953 |
| 2,883,418 | Reppe et al. | Apr. 21, 1959 |

FOREIGN PATENTS

| | | |
|---|---|---|
| 854,948 | Germany | Nov. 10, 1952 |
| 1,093,117 | France | May 2, 1955 |